(12) United States Patent
Fujishima et al.

(10) Patent No.: US 8,468,911 B2
(45) Date of Patent: Jun. 25, 2013

(54) FEED APPARATUS

(75) Inventors: Makoto Fujishima, Nara (JP); Masami Yabuta, Nara (JP)

(73) Assignee: Mori Seiki Co., Ltd, Nara (JP)

( * ) Notice: Subject to any disclaimer, the term of this patent is extended or adjusted under 35 U.S.C. 154(b) by 203 days.

(21) Appl. No.: 13/169,218

(22) Filed: Jun. 27, 2011

(65) Prior Publication Data

US 2012/0096964 A1    Apr. 26, 2012

(30) Foreign Application Priority Data

Oct. 25, 2010 (JP) ................... 2010-238313

(51) Int. Cl.
*B23Q 16/00* (2006.01)
*B23B 29/24* (2006.01)

(52) U.S. Cl.
USPC ............. 74/813 C; 74/816; 74/821; 173/191; 700/33

(58) Field of Classification Search
USPC ............... 74/490.01, 813 C, 816, 821, 89.32, 74/89.39; 409/132, 131; 173/4, 176, 13, 191; 700/28, 32, 33
See application file for complete search history.

(56) References Cited

U.S. PATENT DOCUMENTS

| | | | | |
|---|---|---|---|---|
| 3,946,298 A | * | 3/1976 | van de Loo | 318/685 |
| 4,479,082 A | * | 10/1984 | Schauder et al. | 318/799 |
| 5,058,261 A | * | 10/1991 | Kitamura | 483/18 |
| 5,070,287 A | * | 12/1991 | Boehm | 318/569 |
| 5,073,748 A | * | 12/1991 | Boehm | 318/569 |
| 5,704,250 A | * | 1/1998 | Black | 74/89.3 |
| 5,921,726 A | * | 7/1999 | Shiozaki et al. | 408/6 |
| 6,019,554 A | * | 2/2000 | Hong | 409/132 |
| 7,832,289 B2 | * | 11/2010 | Garshelis et al. | 73/862.333 |
| 7,931,131 B2 | * | 4/2011 | Tatsuda | 188/170 |

FOREIGN PATENT DOCUMENTS

JP   2001-047342   2/2001

* cited by examiner

*Primary Examiner* — David M Fenstermacher
(74) *Attorney, Agent, or Firm* — Miller, Matthias & Hull LLP (57) ABSTRACT

A feed apparatus has a ball screw, a nut, a drive motor, a braking mechanism and a controller and moves a movable body vertically. When recognizing a movement command for rapid traverse relating to the movable body, the controller, when the movable body is to be moved upward, moves the movable body past a target position according to the movement command and then reverses the moving direction thereof and moves the movable body to the target position and stops it there, and, when the movable body is to be moved downward, moves the movable body directly to the target position and stops it there. After moving the movable body to the target position and stopping it there, the controller causes the drive motor to keep the position of the movable body at the stop position and causes the braking mechanism to brake the movement of the movable body.

2 Claims, 4 Drawing Sheets

When moving upward

FIG. 4B

When moving downward

PRIOR ART

FEED APPARATUS

TECHNICAL FIELD

This disclosure generally relates to a feed apparatus for moving a movable body with respect to a stationary body in a moving direction having a vertical component. More specifically, this disclosure relates to a feed apparatus capable of reducing a drive current which is supplied to a drive motor for rotating a ball screw about its axis when the movable body is being stopped.

BACKGROUND ART

As a feed apparatus, conventionally, the feed apparatus disclosed in the Japanese Unexamined Patent Application Publication No. 2001-47342 is known, for example. This feed apparatus is provided on a vertical machining center having, as primary components, a bed, a column, a spindle head, a spindle, a saddle, a table, etc., and moves the spindle head that is a movable body with respect to the column that is a stationary body in the vertical direction.

Specifically, this feed apparatus comprises a ball screw disposed on the column in such a manner that its axis extends in the vertical direction and it is rotatable about its axis, a servo motor disposed on the column for rotating the ball screw about its axis, a transmitting mechanism for transmitting the rotational force of the servo motor to the ball screw, a nut fixedly provided on the spindle head and screwed onto the ball screw, and a controller for supplying a drive current to the servo motor and feedback controlling the servo motor.

In this feed apparatus, when a drive current is supplied from the controller to the servo motor and the servo motor is thereby rotated, the rotational force of the servo motor is transmitted to the ball screw via the transmitting mechanism and the ball screw is thereby rotated about its axis and the nut is moved along the ball screw. Thereby, the spindle head is moved up or down.

It is noted that, in the vertical machining center, there are provided, in addition to the above-described feed apparatus, a feed apparatus having a similar configuration as that of the above-described feed apparatus and moving the saddle in a horizontal direction and a feed apparatus having a similar configuration as that of the above-described feed apparatus and moving the table in a horizontal direction orthogonal to the moving direction of the saddle.

SUMMARY OF DISCLOSURE

When moving a movable body, such as the spindle head, the saddle and the table, to a target position according to a movement command and stopping it there, the movable body may be held in position by means of the so-called servo lock, which is a method of supplying a drive current to the servo motor even after the movable body is stopped and causing the servo motor to keep the position of the movable body at the stop position as long as the target position according to the movement command is not changed.

However, where the movable body is held stopped by means of the servo lock, the power consumption of the servo motor is increased because a drive current continues to be supplied to the servo motor even when the movable body is being stopped. Particularly in a feed apparatus for moving a movable body in the vertical direction, an additional load as much as the self-weight of the movable body is applied to the servo motor. Therefore, this feed apparatus consumes more electric power than a feed apparatus for moving a movable body in a horizontal direction.

Therefore, particularly, if, with respect to a feed apparatus for moving a movable body in the vertical direction, the power consumption of its servo motor in the servo lock can be kept low, it is possible to save the energy used by this feed apparatus and to achieve reduction of electric power costs, which is preferable.

The present disclosure has been achieved in view of the above-described circumstances, and an object thereof is to provide a feed apparatus capable of reducing the electric power consumed in the servo lock.

The present disclosure, for achieving the above-described object, relates to a feed apparatus which moves a movable body with respect to a stationary body in a moving direction having a vertical component, and which has a ball screw disposed in such a manner that its axis extends in the moving direction and it is rotatable about its axis, a nut screwed onto the ball screw, a drive motor for rotating the ball screw about its axis, and control means for controlling the operation of the drive motor, one of the ball screw and the nut being disposed on the movable body, the other being disposed on the stationary body, the control means being configured to, after stopping the movement of the movable body, cause the drive motor to keep the position of the movable body at the stop position, wherein:

the feed apparatus further has braking means for braking the movement of the movable body, and the control means is configured to when recognizing a movement command for rapid traverse relating to the movable body, on the basis of a target position according to the movement command for rapid traverse and the current position of the movable body, check whether the movable body is to be moved upward from the current position thereof or is to be moved downward from the current position thereof, when judging that the movable body is to be moved upward, move the movable body past the target position, and then reverse the moving direction of the movable body and move the moving body to the target position and stop it there, and on the other hand, when judging that the movable body is to be moved downward, move the movable body directly to the target position and stop it there, and after moving the movable body to the target position and stopping it there, cause the drive motor to keep the position of the movable body at the stop position and cause the braking means to brake the movement of the movable body.

According to the present disclosure, when a movement command for rapid traverse relating to the movable body is recognized by the control means, the drive motor is controlled and thereby the movable body is moved at a rapid traverse rate. Specifically, when the drive motor is driven, the ball screw is rotated about its axis and the nut is relatively moved along the ball screw, and thereby the movable body is moved in the moving direction having a vertical component at a rapid traverse rate.

At this time, the control means initially checks, on the basis of a target position according to the movement command for rapid traverse and the current position of the movable body, whether the movable body is to be moved upward from the current position thereof or is to be moved downward from the current position thereof. When the movable body is to be moved upward, the movable body is moved past the target position, and then the moving direction of the movable body is reversed and the movable body is moved to the target position and stopped there. Once the movable body is moved to the target position and stopped there, the position of the movable body is kept at the stop position by the drive motor (the movable body is held stopped by means of the servo lock) and the movement of the movable body is braked by the braking means.

On the other hand, when the movable body is to be moved downward, the movable body is moved directly to the target position and stopped there. Once the movable body is moved to the target position and stopped there, the position of the movable body is kept at the stop position by the drive motor (the movable body is held stopped by means of the servo lock) and the movement of the movable body is braked by the braking means.

As described above, in the present disclosure, when the movable body is moved at a rapid traverse rate, the movable body is moved directly to the target position and stopped there when the movable body is to be moved downward, and, on the other hand, the movable body is moved past the target position and then is returned to the target position and stopped there when the movable body is to be moved upward.

The reason for this configuration is that the power consumption of the drive motor when the movable body is moved upward and then stopped and the power consumption of the drive motor when the movable body is moved downward and then stopped differ even if the movable body is stopped at the same position.

That is, since a frictional force in the direction opposite to the direction in which the movable body is to be moved acts on the movable body, when the movable body is to be moved upward, the force of gravity mg and a frictional force μN act on the movable body as a downward force and, since the supporting force F of the drive motor for supporting the movable body is equal to the force acting downward on the movable body, the supporting force F is F=mg+μN. On the other hand, when the movable body is to be moved downward, the force of gravity mg acts on the movable body as a downward force and a frictional force μN acts on the movable body as an upward force and, since the supporting force F of the drive motor for supporting the movable body is equal to the force acting downward on the movable body, the supporting force F is F=mg−μN.

Therefore, the supporting force F is smaller when the movable body is moved downward than when the movable body is moved upward. Further, the larger the supporting force F is, the larger the drive current supplied to the drive motor is. In addition, since the drive current supplied to the drive motor when the position of the movable body is kept at the stop position is equal to the drive current supplied to the drive motor just before the movable body is stopped, the drive current supplied to the drive motor when the position of the movable body is kept at the stop position is smaller when the movable body is moved downward and then stopped than when the movable body is moved upward and then stopped. Therefore, the power consumption of the drive motor in the servo lock is smaller when the movable body is moved downward and then stopped.

In addition, since not only is the position of the movable body kept at the stop position by the drive motor but also the movement of the movable body is braked by the braking means, the power consumption of the drive motor when the movable body is being stopped is more reduced as compared with when merely the position of the movable body is kept at the stop position by the drive motor.

Thus, according to the feed apparatus of the disclosure, when the direction in which the movable body is to be moved at a rapid traverse rate is the upward direction, the movable body is moved past the target position and then the moving direction of the movable body is reversed and the movable body is moved to the target position and stopped there. Therefore, even when the movable body is to be moved upward, the moving direction of the movable body just before the movable body is stopped is the downward direction and the power consumption of the drive motor when the position of the movable body is kept at the stop position can be kept lower than that in a case where the movable body is moved upward directly to the target position and stopped there. Further, since the movement of the movable body is braked by the braking means, the power consumption of the drive motor when the position of the movable body is kept at the stop position can be further reduced.

Therefore, the power consumption when the movable body is moved in the moving direction having a vertical component at a rapid traverse rate and stopped can be kept low, and thereby it is possible to save the energy used by the feed apparatus and to achieve reduction of electric power costs.

Further, the sequence of operations from when the movable body starts moving upward or downward at a rapid traverse rate to when the movement of the movable body is braked by the braking means after stopping the movable body is automatically executed according to a movement command for rapid traverse. Therefore, the generation of an NC program can be simplified and the efficiency thereof can be improved as compared with when a command for rapid traverse and a command for braking are separated, for example.

It is noted that the control means may be configured to, when judging that the movable body is to be moved upward, move the movable body from the position past the target position to the target position at a rapid traverse rate lower than the rapid traverse rate when moving the movable body upward to the position past the target position.

The drive current supplied to the drive motor is increased as the rapid traverse rate is increased. Further, since the drive current supplied to the drive motor when the position of the movable body is kept at the stop position is equal to the drive current supplied to the drive motor just before the movable body is stopped, when the rapid traverse rate when moving the movable body from the position past the target position to the target position is higher, the drive current supplied to the drive motor is larger and therefore the power consumption when the position of the movable body is kept at the stop position is greater.

Therefore, the power consumption of the drive motor when the position of the movable body is kept at the stop position can be even further reduced by decreasing the rapid traverse rate when moving the movable body from the position past the target position to the target position to a rapid traverse rate lower than the rapid traverse rate when moving the movable body upward to the position past the target position.

As described above, according to the feed apparatus of the present disclosure, the power consumption of the drive motor when the moving body is being stopped in a case where a movable body is to be moved upward at a rapid traverse rate and stopped can be reduced.

DETAILED DESCRIPTION

Hereinafter, a specific embodiment of the present disclosure will be described on the basis of the accompanying drawings.

Figure 1:
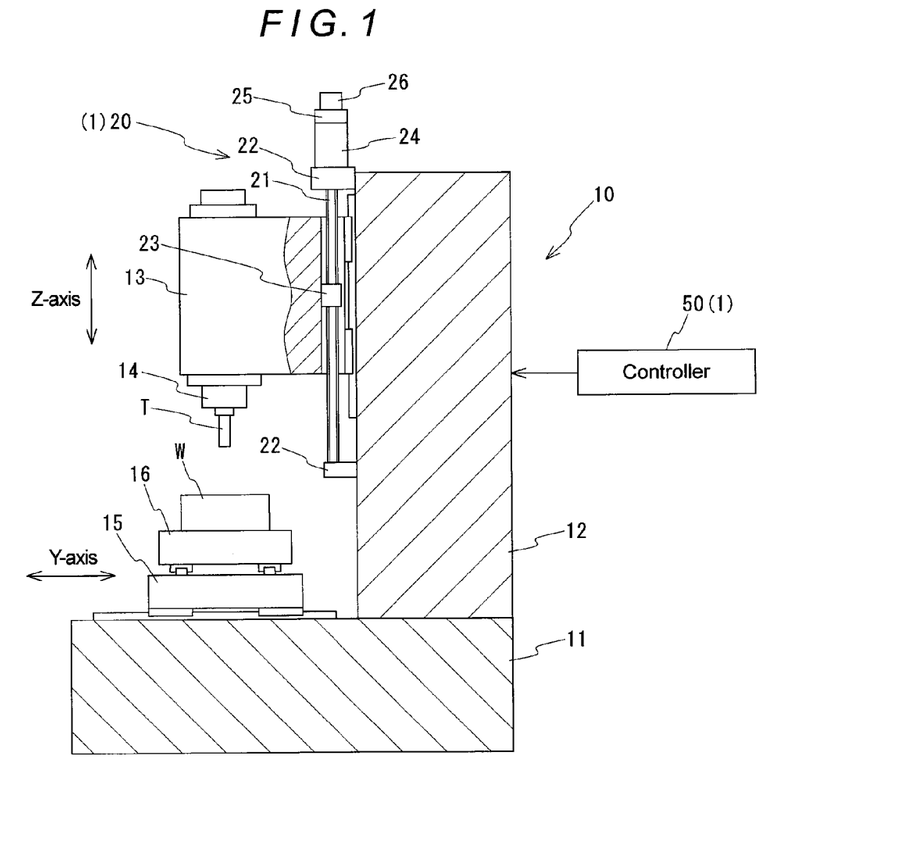
FIG. 1 is a sectional view showing a schematic configuration of a machine tool having a feed apparatus according to one embodiment of the disclosure.
Figure 2:
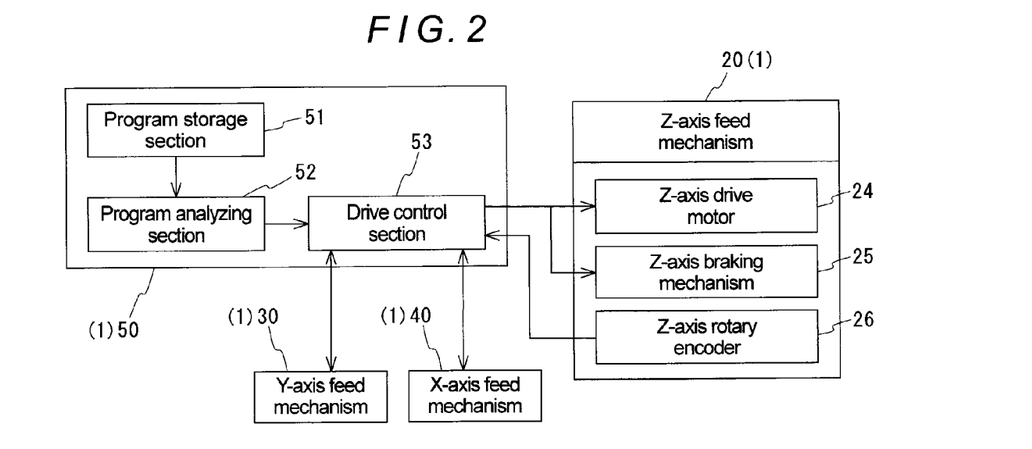
FIG. 2 is a block diagram showing a schematic configuration of the feed apparatus etc. according to the embodiment.

As shown in FIGS. 1 and 2, a feed apparatus 1 of the embodiment is provided on a machine tool 10, and comprises a Z-axis feed mechanism 20 for moving a spindle head 13 in the vertical direction (the Z-axis direction), a Y-axis feed mechanism 30 for moving a saddle 15 in a horizontal direction (the Y-axis direction), an X-axis feed mechanism 40 for moving a table 16 in a horizontal direction (the X-axis direction) orthogonal to both the Z axis and the Y axis, a controller 50 for controlling the operations of the feed mechanisms 20, 30, 40, and other components.

The machine tool 10 has, as primary components, a bed 11, a column 12 disposed on the bed 11, the spindle head 13 which is supported by the column 12 to be movable in the Z-axis direction, a spindle 14 supported by the spindle head 13 to be rotatable about its axis and holding a tool T, the saddle 15 which is disposed on the bed 11 to be movable in the Y-axis direction, and the table 16 which is disposed on the saddle 15 to be movable in the X-axis direction and on which a workpiece W is loaded.

The Z-axis feed mechanism 20 comprises a Z-axis ball screw 21 disposed with its axis extending in the Z-axis direction, two support members 22 which are provided on the column 12 and support the Z-axis ball screw 21 at the ends thereof in such a manner that the Z-axis ball screw 21 is rotatable about its axis, a Z-axis nut 23 provided on the spindle head 13 and screwed onto the Z-axis ball screw 21, a Z-axis drive motor 24 which is provided on the upper support member 22 and rotates the Z-axis ball screw 21 about its axis, a Z-axis braking mechanism 25 for stopping the rotation of a rotary shaft of the Z-axis drive motor 24, and a Z-axis rotary encoder 26 for detecting the position of the spindle head 13 in the Z-axis direction. It is noted that the Z-axis drive motor 24 comprises a servo motor, for example, and the Z-axis braking mechanism 25 comprises an electromagnetic brake, for example.

In the Z-axis feed mechanism 20, when the Z-axis drive motor 24 is driven and the Z-axis ball screw 21 is thereby rotated about its axis, the Z-axis nut 23 is moved along the Z-axis ball screw 21, and thereby the spindle head 13 is moved in the Z-axis direction. Further, when the rotation of the rotary shaft of the Z-axis drive motor 24 is stopped by the Z-axis braking mechanism 25, the rotation of the Z-axis ball screw 21 is stopped, and thereby the movement of the spindle head 13 in the Z-axis direction is braked.

Although the configurations of the Y-axis and X-axis feed mechanisms 30 and 40 are not shown in detail, they each have a similar configuration as that of the Z-axis feed mechanism 20.

The controller 50 has a program storage section 51 in which a previously generated NC program is stored, a program analyzing section 52 for analyzing the NC program stored in the program storage section 51 block by block in sequence and extracting operation commands (including movement commands for rapid traverse) relating to the spindle head 13, the saddle 15 and the table 16, and a drive control section 53 for controlling the feed mechanisms 20, 30, 40 on the basis of the operation commands extracted by the program analyzing section 52.

Figure 3:
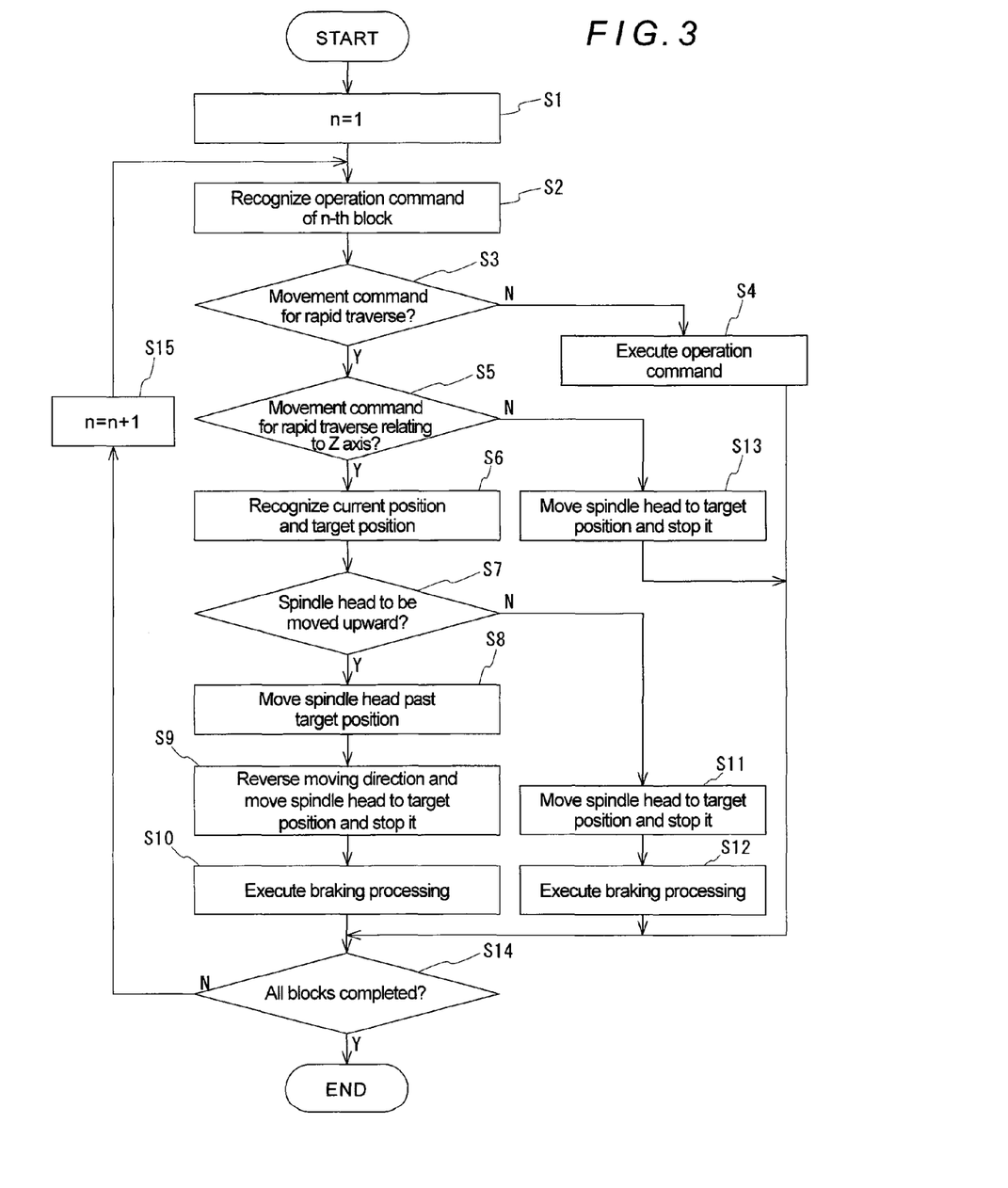
FIG. 3 is a flow chart showing a sequence of processing in a drive control section according to the embodiment.

The drive control section 53 controls the feed mechanisms 20, 30, 40 by performing a sequence of processing as shown in FIG. 3. It is noted that the drive control section 53 supplies a drive current to the Z-axis drive motor 24 and the drive motors of the Y-axis and X-axis feed mechanisms 30 and 40, and feedback controls the moving positions of the spindle head 13, the saddle 15 and the table 16 on the basis of the movement commands extracted by the program analyzing section 52 and the positions of the spindle head 13, the saddle 15 and the table 16 detected by the Z-axis rotary encoder 26 and the rotary encoders of the Y-axis and X-axis feed mechanisms 30 and 40.

As shown in FIG. 3, the drive control section 53 initially sets a counter n to n=1 (Step S1), and then recognizes an operation command of the n-th block, which command is extracted by the program analyzing section 52, (Step S2) and checks whether the recognized operation command is a movement command for rapid traverse (Step S3).

When a judgment is made that it is not a movement command for rapid traverse, the operation command recognized in Step S2 is executed (Step S4), and then the processing in Step S14 which will be described later is executed. For example, when the operation command recognized in Step S2 is a movement command for moving the spindle head 13 in the Z-axis direction at a cutting feed rate, on the basis of the target position according to the movement command and the cutting feed rate according to the movement command and the position (current position) of the spindle head 13 detected by the Z-axis rotary encoder 26, the Z-axis drive motor 24 is driven and the spindle head 13 is moved to the target position according to the movement command at the cutting feed rate according to the movement command and stopped there. Once the spindle head 13 is moved to the target position and stopped there, the position of the spindle head 13 is kept at the stop position by the Z-axis drive motor 24, that is, the spindle head 13 is held stopped by means of the servo lock.

It is noted that, also when the operation command recognized in Step S2 is a movement command for moving the saddle 15 in the Y-axis direction at a cutting feed rate or a movement command for moving the table 16 in the X-axis direction at a cutting feed rate, the saddle 15 or the table 16 is moved to the position according to the movement command and stopped there in a similar manner.

On the other hand, when, in Step S3, a judgment is made that the recognized operation command is a movement command for rapid traverse, the drive control section 53 further checks whether it is a movement command for rapid traverse relating to the Z axis (Step S5). When a judgment is made that it is a movement command for rapid traverse relating to the Z axis, the drive control section 53 recognizes the position (current position) of the spindle head 13 detected by the Z-axis rotary encoder 26 and the target position according to the movement command for rapid traverse (Step S6).

Thereafter, on the basis of the recognized current position of the spindle head 13 and the recognized target position, the drive control section 53 compares them and recognizes whether the spindle head 13 is to be moved upward from the current position thereof or is to be moved downward from the current position thereof (Step S7). When a judgment is made that the spindle head 13 is to be moved upward, initially, the Z-axis drive motor 24 is driven and the spindle head 13 is moved to a position past the target position at a predetermined normal rapid traverse rate (Step S8). It is noted that the amount of excess movement (the amount of over-movement) past the target position is previously set by parameters, for example, and the drive control section 53 recognizes the amount of excess movement and then moves the spindle head 13 to a position past the target position. Further, the amount of excess movement can be set to 1 mm, for example, and in this case the spindle head 13 is moved to the position away from the target position by 1 mm past the target position.

Once the spindle head 13 is moved to a position past the target position, which position is away from the target position by a predetermined amount, the moving direction of the spindle head 13 is reversed and the spindle head 13 is moved to the target position at a rapid traverse rate and stopped there. Once the spindle head 13 is moved to the target position and stopped there, the position of the spindle head 13 is kept at the stop position by the Z-axis drive motor 24 (Step S9). It is noted that although the spindle head 13 is moved at a rapid traverse rate also when being moved from the position past the target position to the target position, the rapid traverse rate at this time is lower than the normal rapid traverse rate, and therefore, is lower than the rapid traverse rate when moving the spindle head 13 to the position past the target position.

Subsequently, braking processing is performed. That is, the rotation of the rotary shaft of the Z-axis drive motor 24 is stopped by the Z-axis braking mechanism 25 and the movement of the spindle head 13 in the Z-axis direction is thereby braked (Step S10). Thereafter, the processing in Step S14 which will be described later is executed.

On the other hand, when, in Step S7, a judgment is made that the spindle head 13 is to be moved downward, the spindle head 13 is moved directly to the target position at the normal rapid traverse rate and stopped there. Once the spindle head 13 is moved to the target position and stopped there, the position of the spindle head 13 is kept at the stop position by the Z-axis drive motor 24 (Step S11).

Subsequently, the braking processing is performed. That is, the rotation of the rotary shaft of the Z-axis drive motor 24 is stopped by the Z-axis braking mechanism 25 and the movement of the spindle head 13 in the Z-axis direction is thereby braked (Step S12). Thereafter, the processing in Step S14 which will be described later is executed.

When, in Step S5, a judgment is made that the movement command for rapid traverse is not a movement command for rapid traverse relating to the Z axis, the Y-axis feed mechanism 30 or the X-axis feed mechanism 40 is controlled and thereby the saddle 15 or the table 16 is moved to a target position according to the movement command for rapid traverse and stopped there Once the saddle 15 or the table 16 is moved to the target position and stopped there, the position of the saddle 15 or the table 16 is kept at the stop position by the drive motor of the Y-axis feed mechanism 30 or the drive motor of the X-axis feed mechanism 40 (Step S13). Thereafter, the processing in Step S14 which will be described below is executed.

In Step S14, it is checked whether the execution of all blocks in the NC program have been completed. When the execution of all blocks in the NC program has not been completed, all blocks in the NC program are executed while updating the counter n (Steps S2 to S15). After the execution of all blocks in the NC program has been completed, the sequence of processing described above is terminated.

As a case where the spindle head 13 is moved upward at a rapid traverse rate, there can be mentioned, for example, a case where the spindle head 13 is moved to a position for tool change in order to cause a tool changer to change the tool T held by the spindle 14. Further, if the movement of the spindle head 13 is being braked by the Z-axis braking mechanism 25 when the spindle head 13 is to be moved in the Z-axis direction, the braking by the Z-axis braking mechanism 25 is initially released and then the spindle head 13 is moved.

According to the feed apparatus 1 of the embodiment having the above-described configuration, as described above, when the spindle head 13 is moved at a rapid traverse rate, the spindle head 13 is moved directly to the target position and stopped there in a case where the spindle head 13 is to be moved downward, and the spindle head 13 is moved past the target position and then is returned to the target position and stopped there in a case where the spindle head 13 is to be moved upward.

The reason for employing this configuration is that the power consumption of the Z-axis drive motor 24 when the spindle head 13 is moved upward and then stopped and the power consumption of the Z-axis drive motor 24 when the spindle head 13 is moved downward and then stopped differ even if the spindle head 13 is stopped at the same position.

Figure 4A:
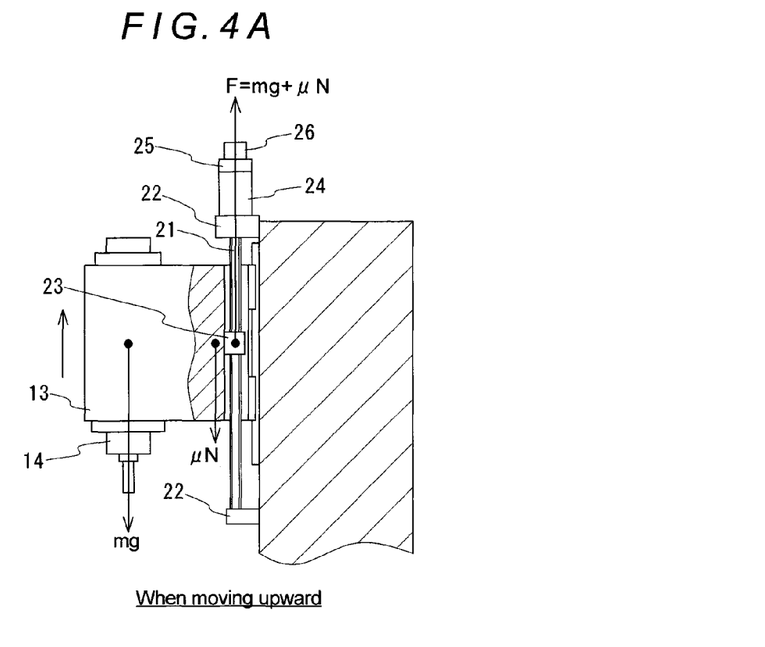
FIG. 4A is an illustration showing the relationship among forces acting on a spindle head when moving it upward.
Figure 4B:
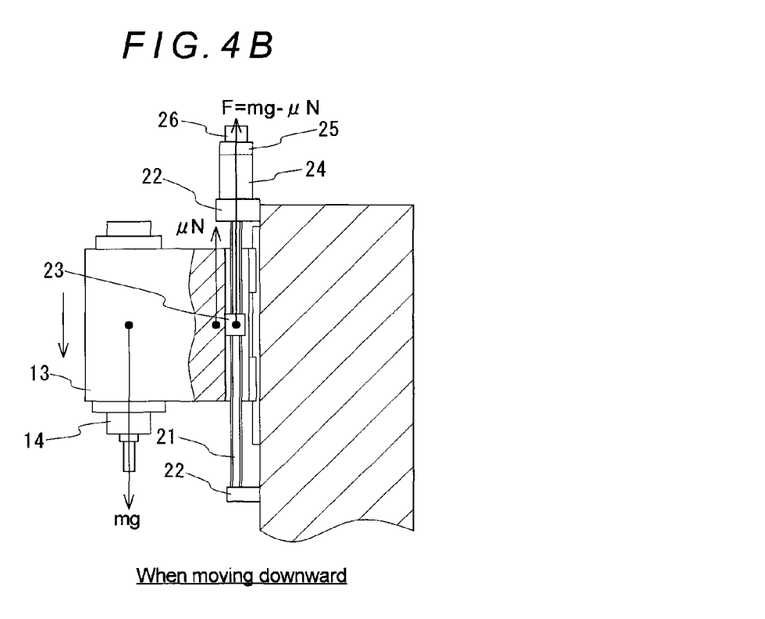
FIG. 4B is an illustration showing the relationship among forces acting on the spindle head when moving it downward.

That is, since a frictional force in the direction opposite to the direction in which the spindle head 13 is to be moved acts on the spindle head 13, when the spindle head 13 is to be moved upward, as shown in FIG. 4A, the force of gravity mg and a frictional force μN act on the spindle head 13 as a downward force and, since the supporting force F of the Z-axis drive motor 24 for supporting the spindle head 13 is equal to the force acting downward on the spindle head 13, the supporting force F is F=mg+μN. On the other hand, when the spindle head 13 is to be moved downward, as shown in FIG. 4B, the force of gravity mg acts on the spindle head 13 as a downward force and a frictional force μN acts on the spindle head 13 as an upward force and, since the supporting force F of the Z-axis drive motor 24 for supporting the spindle head 13 is equal to the force acting downward on the spindle head 13, the supporting force F is F=mg−μN.

Therefore, the supporting force F is smaller when the spindle head 13 is moved downward than when the spindle head 13 is moved upward. Further, the larger the supporting force F is, the larger the drive current supplied to the Z-axis drive motor 24 is. In addition, since the drive current supplied to the Z-axis drive motor 24 when the position of the spindle head 13 is kept at the stop position is equal to the drive current supplied to the Z-axis drive motor 24 just before the spindle head 13 is stopped, the drive current supplied to the Z-axis drive motor 24 when the position of the spindle head 13 is kept at the stop position is smaller when the spindle head 13 is moved downward and then stopped than when the spindle head 13 is moved upward and then stopped. Therefore, the power consumption of the Z-axis drive motor 24 in the servo lock is smaller when the spindle head 13 is moved downward and then stopped.

Furthermore, since not only is the position of the spindle head 13 kept at the stop position by the Z-axis drive motor 24 but also the movement of the spindle head 13 in the Z-axis direction is braked by the Z-axis braking mechanism 25, the power consumption of the Z-axis drive motor 24 when the spindle head 13 is being stopped is more reduced as compared with when merely the position of the spindle head 13 is kept at the stop position by the Z-axis drive motor 24.

As described above, according to the feed apparatus 1 of the embodiment, when the direction in which the spindle head 13 is to be moved at a rapid traverse rate is the upward direction, the spindle head 13 is moved past the target position and then the moving direction of the spindle head 13 is reversed and the spindle head 13 is moved to the target position and stopped there. Therefore, even when the spindle head 13 is to be moved upward, the moving direction of the spindle head 13 just before the spindle head 13 is stopped is the downward direction and the power consumption of the Z-axis drive motor 24 when the position of the spindle head 13 is kept at the stop position can be kept lower than that in a case where the spindle head 13 is moved upward directly to the target position and stopped there. Further, since the movement of the spindle head 13 is braked by the Z-axis braking mechanism 25, the power consumption of the Z-axis drive motor 24 when the position of the spindle head 13 is kept at the stop position can be further reduced.

Therefore, the power consumption of the Z-axis drive motor 24 when the spindle head 13 is moved in the Z-axis direction at a rapid traverse rate and stopped can be kept low, and thereby it is possible to save the energy used by the feed apparatus 1 and to achieve reduction of electric power costs.

Further, since the rapid traverse rate when moving the spindle head 13 from the position past the target position to the target position is lower than the normal rapid traverse rate, the power consumption of the Z-axis drive motor 24 when the position of the spindle head 13 is kept at the stop position can be even further reduced. The reason for this is that the drive current supplied to the Z-axis drive motor 24 is increased as the rapid traverse rate is increased, and that, when the rapid traverse rate when moving the spindle head 13 from the position past the target position to the target position is higher, the drive current supplied to the Z-axis drive motor 24 is larger and therefore the power consumption of the Z-axis drive motor 24 when the position of the spindle head 13 is kept at the stop position is greater because the drive current supplied to the Z-axis drive motor 24 when the position of the spindle head 13 is kept at the stop position is equal to the drive current supplied to the Z-axis drive motor 24 just before the spindle head 13 is stopped.

Furthermore, the sequence of operations from the spindle head 13 starts moving in the Z-axis direction at a rapid traverse rate to when the movement of the spindle head 13 is braked by the Z-axis braking mechanism 25 after stopping the spindle head 13 is automatically executed according to the movement command for rapid traverse. Therefore, the generation of an NC program can be simplified and the efficiency thereof can be improved as compared with when a command for rapid traverse and a command for braking are separated, for example.

Figure 5A:
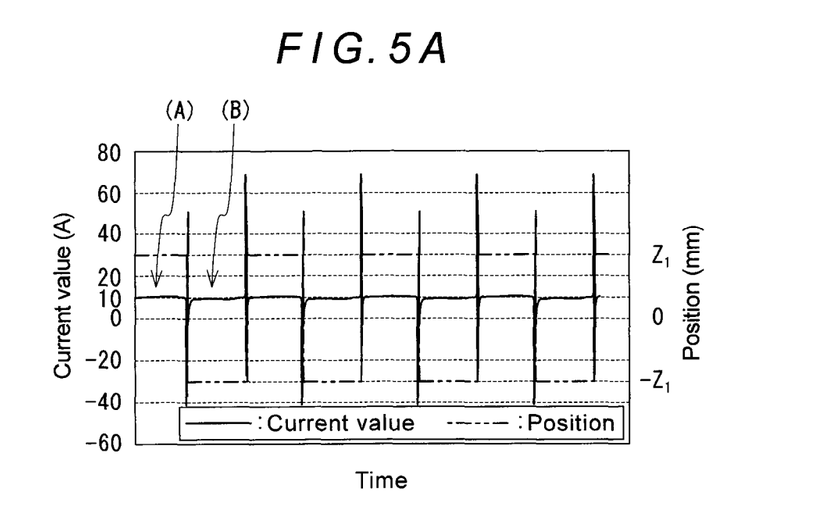
FIG. 5A is a graph showing the drive current supplied to a Z-axis drive motor in a case where the spindle head is moved past a target position and then the moving direction of the spindle head is reversed and the spindle head is moved to the target position and stopped there when the spindle head is to be moved upward and, on the other hand, the spindle head is moved directly to a target position and stopped there when the spindle head is to be moved downward.
Figure 5B:
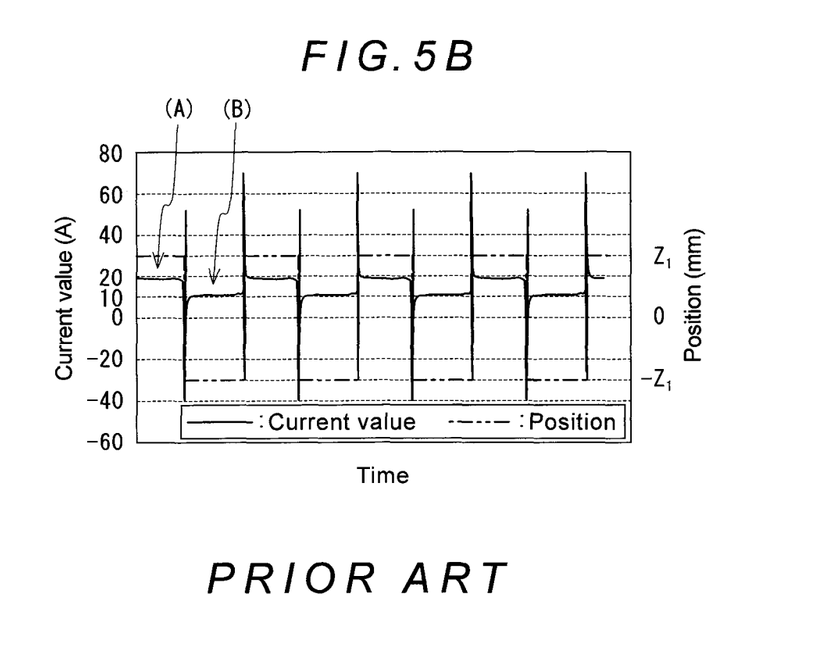
FIG. 5B is a graph showing the drive current supplied to the Z-axis drive motor in a care where the spindle head is directly to a target position and stopped there both when the spindle head is to be moved upward and when the spindle head is to be moved downward.

In this connection, when the spindle head 13 was moved up and down between a position $+Z_1$ and a position $-Z_1$ while holding the spindle head 13 at each of the positions $+Z_1$ and $-Z_1$ for a predetermined time period and the drive current supplied to the Z-axis drive motor 24 during that was measured, graphs as shown in FIGS. 5A and 5B were obtained. That is, in a case where, like the embodiment, when the spindle head 13 was to be moved upward, the spindle head 13 was moved past the target position and then the moving direction of the spindle head 13 was reversed and the spindle head 13 was moved to the target position and stopped there and then the position of the spindle head 13 was kept at the stop position by the Z-axis drive motor 24, and when the spindle head 13 was to be moved downward, the spindle head 13 was moved directly to the target position and stopped there and then the position of the spindle head 13 was kept at the stop position by the Z-axis drive motor 24, the graph shown in FIG. 5A was obtained. In a case where, like the conventional feed apparatus, both when the spindle head 13 was to be moved upward and when the spindle head 13 was to be moved downward, the spindle head 13 was moved directly to the target position and stopped there and then the position of the spindle head 13 was kept at the stop position by the Z-axis drive motor 24, the graph shown in FIG. 5B was obtained.

As seen from FIG. 5A, in a case where the spindle head 13 is moved according to the embodiment, the drive current measured when the spindle head 13 is being stopped is about 10 A both when the spindle head 13 is moved upward and stopped (A) and when the spindle head 13 is moved downward and stopped (B). On the other hand, as seen from FIG. 5B, in a case where the spindle head 13 is moved in the conventional manner, the drive current measured when the spindle head 13 is being stopped is about 20 A when the spindle head 13 is moved upward and stopped (A) and is about 10 A when the spindle head 13 is moved downward and stopped (B), and the drive current supplied to the Z-axis drive motor 24 when the spindle head 13 is moved upward and stopped is about twice the drive current supplied to the Z-axis drive motor 24 when the spindle head 13 is moved downward and stopped. Therefore, also from these graphs, it can seen that moving the spindle head 13 upward and stopping it according to the embodiment enables the power consumption of the Z-axis drive motor 24 when the position of the spindle head 13 is kept at the stop position by the Z-axis drive motor to be kept low, and thereby it is possible to save the energy used by the feed apparatus 1 and to achieve reduction of electric power costs.

Thus, one embodiment of the present disclosure has been described. However, the disclosure is not limited thereto and other embodiments are possible.

In the above embodiment, the spindle head 13 is configured to move up and down in the vertical direction. However, the spindle head 13 may be configured to move up and down in an oblique direction, and the power consumption can be reduced by the feed apparatus 1 having this configuration.

Further, in the embodiment, the movement of the spindle head 13 in the Z-axis direction is braked by causing the Z-axis braking mechanism 25 by stopping the rotation of the rotary shaft of the Z-axis drive motor 24. However, the movement of the spindle head 13 in the Z-axis direction may be braked by stopping the rotation of the Z-axis ball screw 21.

What is claimed is:

1. A feed apparatus which moves a movable body with respect to a stationary body in a moving direction having a vertical component, and which has a ball screw disposed in such a manner that a ball screw axis extends in the moving direction and is rotatable about the ball screw axis, a nut threadably engaging the ball screw, a drive motor for rotating the ball screw about the ball screw axis, and control means for controlling the operation of the drive motor, one of the ball screw and the nut being disposed on the movable body, the other being disposed on the stationary body, the control means being configured to, after stopping the movement of the movable body, cause the drive motor to maintain the movable body at the stop position, wherein:

the feed apparatus further has braking means for braking movement of the movable body, and the control means is configured to:

when recognizing a movement command for rapid traverse relating to the movable body, on the basis of a target position according to the movement command for rapid traverse and the current position of the movable body, check whether the movable body is to be moved upward from the current position thereof or is to be moved downward from the current position thereof;

when judging that the movable body is to be moved upward, move the movable body upward past the target position, and then reverse the moving direction of the movable body and move the moving body to the target position, and on the other hand, when judging that the movable body is to be moved downward, move the movable body directly to the target position; and after moving the movable body to the target position, cause the drive motor to keep the position of the movable body at the stop position and cause the braking means to brake the movement of the movable body.

2. The feed apparatus according to claim 1, wherein the controller is configured to move the movable body from the position past the target position to the target position at a rapid traverse rate lower than the rapid traverse rate at the time of the upward movement when judging the movable body is to be moved upward.

* * * * *